United States Patent
Ishino

(10) Patent No.: US 7,297,750 B2
(45) Date of Patent: Nov. 20, 2007

(54) CLEAR PAINT FOR GOLF BALLS AND GOLF BALL

(75) Inventor: Yuichi Ishino, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 343 days.

(21) Appl. No.: 10/870,461

(22) Filed: Jun. 18, 2004

(65) Prior Publication Data

US 2004/0225078 A1    Nov. 11, 2004

Related U.S. Application Data

(63) Continuation-in-part of application No. 10/091,474, filed on Mar. 7, 2002, now abandoned.

(30) Foreign Application Priority Data

May 2, 2001  (JP)  .............................. 2001-135266
May 2, 2001  (JP)  .............................. 2001-135267

(51) Int. Cl.
*A63B 37/14* (2006.01)
*C08G 18/04* (2006.01)
*C08L 83/10* (2006.01)

(52) U.S. Cl. ...................... 525/458; 525/474; 473/351; 473/378; 427/412.3

(58) Field of Classification Search ................ 525/458, 525/474; 473/378

See application file for complete search history.

(56) References Cited

U.S. PATENT DOCUMENTS

| | | | | |
|---|---|---|---|---|
| 3,585,065 A | * | 6/1971 | Johnson | 525/193 |
| 3,689,310 A | * | 9/1972 | Johnson | 427/500 |
| 5,391,648 A | * | 2/1995 | Yamamoto et al. | 525/479 |
| 5,669,831 A | * | 9/1997 | Lutz | 473/377 |
| 5,725,443 A | * | 3/1998 | Sugimoto et al. | 473/378 |
| 5,817,735 A | * | 10/1998 | Hatch et al. | 528/84 |
| 5,820,491 A | * | 10/1998 | Hatch et al. | 473/378 |
| 6,022,925 A | * | 2/2000 | Tomko et al. | 524/547 |
| 6,313,249 B1 | * | 11/2001 | Nakanishi et al. | 526/279 |
| 6,313,335 B1 | * | 11/2001 | Roberts et al. | 556/419 |
| 6,398,669 B1 | * | 6/2002 | Yokota et al. | 473/378 |
| 6,573,320 B2 | * | 6/2003 | Ito et al. | 524/261 |
| 2003/0050425 A1 | * | 3/2003 | Kennedy et al. | 528/55 |

OTHER PUBLICATIONS

Derwent Abstract of JP 2001172468; Shinetsu Chem.; "Organic Polymer, comprises diorganopolysiloxane groups on the surface . . . "; Jun. 26, 2001.*
Derwent Abstract of JP 2001214131 A; Bridgestone Corp; "Clear paint for golf balls, contains organosilicon compound"; Aug. 7, 2001.*
Derwent Abstract of JP 2001011376 A; Bridgestone Corp; "Coating Material for finished wooden product"; May 8, 2001.*
Derwent Abstract of JP 10330684 A; Toa Gosei Chem.; "Coating compositions comprising a graft copolymer"; Dec. 15, 1998.*
Derwent Abstract of JP 11116894 A; Kaneka Corp.; "Curable Compositions fortop coats and articles . . . "; Apr. 27, 1999.*
JPO Abstract of JP 2000051403 A; Sumitomo Rubber Ind Ltd; "Golf Ball"; Feb. 22, 2000.*
JPO Abstract of JP 405269221 A' Bridgestone Corp; "Golf ball"; Oct. 16, 1993.*
Derwent Abstract of JP 2001123113 A; Coating material for finished wooden poroducts; May 8, 2001.*

* cited by examiner

*Primary Examiner*—David J. Buttner
*Assistant Examiner*—John J. Figueroa
(74) *Attorney, Agent, or Firm*—Manabu Kanesaka

(57) ABSTRACT

A clear paint for golf balls includes essentially a base polymer including a polyurethane resin, and a graft polymer including a comb polymer having a backbone portion formed of an acrylic resin and a branch portion formed of polyorganosiloxane. The backbone portion of the comb polymer has at least one hydroxyl group.

10 Claims, No Drawings

CLEAR PAINT FOR GOLF BALLS AND GOLF BALL

CROSS REFERENCE TO RELATED APPLICATION

This is a continuation-in-part application of a patent application Ser. No. 10/091,474 filed on Mar. 7, 2002 now abandoned.

FIELD OF THE INVENTION

The present invention relates to a clear paint for golf balls which can form a coated surface having excellent stain resistance, excellent scuff resistance and low surface friction coefficient, i.e. high sliding property, and to a golf ball of which exterior is coated with the above clear paint.

BACKGROUND OF THE INVENTION

From the structural point of view, golf balls are generally classified into two categories: wound golf balls and solid golf balls. The wound golf balls have a rubber core containing some liquid, rubber yarn wound around the core being stretched about ten times, and a cover thereon. The solid golf balls are hard rubber solid spheres. There are solid golf balls of one-piece type and of two-piece type.

For any golf ball, the top surfaces of materials are coated with paint layer. This paint layer generally has a double layer structure which consists of a white painting layer and a clear painting layer such that the clear painting layer forms the top layer of a golf ball. Conventionally, the clear painting layer is formed by applying a clear paint of urethane resin series.

Such paint layer is required to have various characteristics. A paint layer for a golf ball is required to have excellent toughness for withstanding strong impact produced by hitting with a club face and also to have flexibility for following the deformation of the ball caused by the impact. When the ball falls down on the ground, the ball is strongly abraded with grasses, mud, fine gravels, and the like because the ball rotates. This leads to the following phenomenon that the gloss of the ball is reduced by such abrasion, that the mud enters into flaws produced therein, and that the ball is contaminated with grass axil. Nowadays, golf balls are desired to retain their white appearance and their gloss even after used. Therefore, paint layers for golf balls are desired to have excellent wear resistance and excellent scuff resistance and to be hard to be contaminated so that their white appearance and their gloss are recovered by wiping off mud and grass axil.

However, a conventional golf ball of which top surface is a clear painting layer of urethane resin is remarkably contaminated after used. In particular, oil dirt and grass axil can not be removed even being wiped with a wet dust cloth. Further, since dirt enters into fine flaws produced therein by friction and impacts, the original white appearance and gloss are hardly recovered.

Therefore, there is a need to provide a paint which is flexible and has great elongation and scuff resistance. However, if using such a paint, a resultant ball adversely has high friction on its surface. In a place, such as a driving range, where a large number of golf balls are collected and transported, too large friction may lead to plugging of golf balls in a transporting passage because the balls are in contact with high frictional force. This trouble is so-called blocking phenomenon.

Japanese patent publication H5-269221A discloses a clear paint of urethane series which contains an organic modified polysiloxane including hydroxyl group. By using the clear paint, a resultant golf ball can be provided with a paint layer having good impact resistance and high sliding property. In the above JP H5-269221A, the organic modified polysiloxane including hydroxyl group is concretely polyester modified polysiloxane including hydroxyl group Byk-370 (available from BYK Chemie Japan K.K.).

However, the paint disclosed in JP H5-269221A has following disadvantages.

The organic modified polysiloxane including hydroxyl group exhibiting a role of providing the sliding property can react with the binder resin. Since the organic modified polysiloxane including hydroxyl group has high surface activity, it easily diffuses into the surface and remains on the surface of the paint layer because of its reactivity. Because of such properties of the organic modified polysiloxane including hydroxyl group, the paint disclosed in Japanese patent publication H5-269221A shows sufficient sliding property. However, in driving ranges and the like, golf balls are often in contact with water, such as dipped in cleaning solution for removing dirt and exposed to rain. When the surface of the golf ball is in contact with water, unreacted organic modified polysiloxane including hydroxyl group or relatively low molecular weight resin components (including polysiloxane) may leach out into water, resulting in significant deterioration of sliding property. Particularly, since the organic modified polysiloxane including hydroxyl group easily remains on the surface of coated layer, it easily leaches out into water when dipped in the water. Therefore, the organic modified polysiloxane including hydroxyl group is lost due to the leaching so that the effect of the sliding property can not be maintained for a long period of time.

SUMMARY OF THE INVENTION

It is an object of the present invention to provide a golf ball having a clear paint layer formed thereon, wherein the paint layer has excellent scuff resistance, is hardly contaminated so that dirt on the ball can be easily wiped off, has low friction factor on its surface, thus excellent sliding property, and is capable of persisting its sliding property for a long period of time.

A clear paint for golf balls of a first aspect of the invention contains a modified silicone oil having two or more hydroxyl groups at one terminal end.

In the modified silicone oil having two or more hydroxyl groups at one terminal end, its backbone chain (principal chain or main chain) such as polydimethylsiloxane has characteristics as a silicone oil, thus improving the sliding property and the stain resistance of the resultant paint layer.

To persist the sliding property and the stain resistance exhibited by the silicone oil added in the clear paint, it is necessary to incorporate the silicone oil into the cross-linking structure of the base polymer of the clear paint in the stable state, to prevent the reduction in cross-linking density due to addition of the silicone oil, and to prevent the silicone oil from being segregated and thus exposed to the surface of the resultant paint layer (clear paint layer).

The base polymer of the clear paint for golf balls generally is urethane resin which is made of polyester polyol and isocyanate. The modified silicone oil having two or more hydroxyl groups at one terminal used in the first aspect can effectively react with isocyanate so that it is easily incorporated into the three-dimensional structure of urethane resin as the base polymer, thereby stably existing in the resultant paint layer. Therefore, according to the first aspect, unlike the organic modified polysiloxane including hydroxyl group disclosed in JP H5-269221A which includes many unreacted components and is thus easily segregated and exposed to the surface, the modified silicone oil is not lost even when subjected to abrasion and washed, thereby enabling to maintain the sliding property of the surface for a long period of time.

A clear paint for golf balls of a second aspect contains a graft polymer.

The graft polymer has a high molecular backbone chain and branched chains bonded to the backbone chain, wherein components of the branched chains are different from the component of the backbone chain, thus improving the sliding property and the stain resistance of the resultant paint layer.

To persist the sliding property and the stain resistance exhibited by the components added in the clear paint, it is necessary to incorporate the components into the cross-linking structure of the base polymer of the clear paint in the stable state, and to prevent them from being segregated and thus exposed to the surface of the resultant paint layer (clear paint layer).

The base polymer of the clear paint for golf balls generally is urethane resin which is made of polyester polyol and isocyanate. The graft polymer used in the second aspect has excellent compatibility with the base polymer because of its backbone. Particularly in case that the backbone has hydroxyl group, the hydroxyl group can effectively react with isocyanate so that the graft polymer is easily incorporated into the three-dimensional structure of urethane resin as the base polymer, thereby stably existing in the resultant paint layer. Therefore, according to the second aspect, unlike the organic modified polysiloxane including hydroxyl group disclosed in JP H5-269221A which includes many unreacted components and is thus easily segregated and exposed to the surface, the graft polymer is not lost even when subjected to abrasion and washed, thereby enabling to maintain the sliding property of the surface for a long period of time.

A golf ball of the present invention is characterized in that its surface is coated with the clear paint for golf balls of the present invention as mentioned above, and has excellent scuff resistance, is hardly contaminated so that dirt can be easily wiped off, further has excellent sliding property, and is capable of persisting its sliding property for a long period of time.

DETAILED DESCRIPTION OF PREFERRED EMBODIMENTS

Hereinafter, embodiments of the present invention will be described in detail.

First, description will be made as regard to modified silicone oil to be added in a clear paint of a first aspect. The modified silicone oil employed in the first aspect is a modified silicone oil having two or more hydroxyl groups at one terminal end, and preferably is a modified silicone oil of which backbone chain is polydimethylsiloxane and of which one terminal end is bonded to an alkyl group such as a methyl group or a butyl group and the other terminal end is bonded to a functional group having at least two hydroxyl groups. The modified silicone oil is shown in the following chemical formula (1).

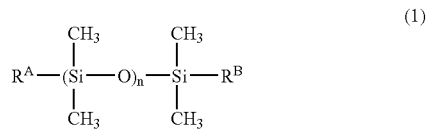

In the above formula (1), $R^A$ represents a non-reactive alkyl group such as a methyl group or a butyl group, $R^B$ represents a functional group having two or more hydroxyl groups, and n is a real number between 5 and 700.

The functional group having two or more hydroxyl groups bonded at the terminal may be represented by the following general formula (2) or (3) and may be represented, for example, by the following structural formula (4).

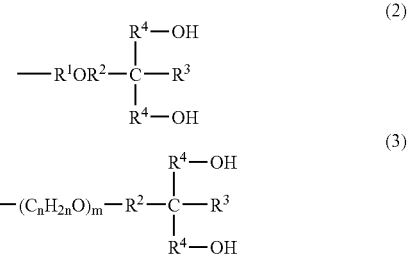

wherein, $R^1$, $R^2$, $R^4$ are alkylene groups having 1 to 10 carbon atoms, $R^3$ is hydrogen, or an alkyl group having 1 to 10 carbon atoms, n is a real number between 1 and 30, and m is a real number between 0 and 500.

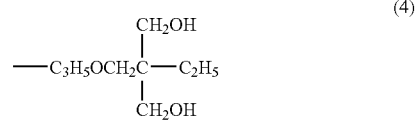

The modified silicone oil may be used alone or in admixture of two or more.

As for the modified silicone oil, its number average molecular weight is preferably from 500 to 50000, its viscosity at a room temperature is preferably from 1 to 50000 mm$^2$/s in view of the solubility to the clear paint, and its hydroxyl value is preferably from 5 to 150 mg-KOH/g in view of the reactivity.

Now, description will be made as regard to graft polymer to be added in a clear paint of a second aspect. The graft polymer employed in the second aspect preferably is a comb polymer of which the number of branched chains (branched polymers) relative to one backbone chain (backbone polymer) is two or more in average, and particularly is a comb polymer of which backbone polymer is composed of an acrylic resin and branched polymers are composed of polyorganosiloxane. The polyorganosiloxane is preferably polydimethylsiloxane in view of the cost and the effect. The acrylic resin is preferably an acrylic resin having at least one hydroxyl group at a terminal end or a branch.

According to the graft polymer as mentioned above, the backbones thereof such as the acrylic resin improve the compatibility with the base polymer of the clear paint. The branches such as the polydimethylsiloxane have properties as silicone oil, thus improving the sliding property and the stain resistance of the coating layer.

The comb polymer is preferably prepared by radical copolymerization of a macromonomer, of which one terminal is an acrylic group and/or a methacryl group and the backbone chain is polydimethylsiloxane, as represented by the following general formula (5) with an acrylic monomer such as methyl methacrylate or methyl acrylate.

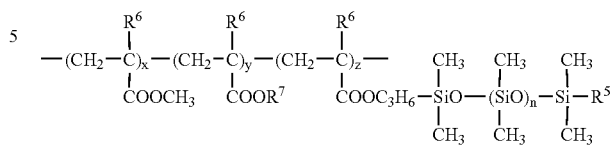

In the above formula (5), $R^c$ represents a non-reactive alkyl group such as a methyl group or a butyl group, $R^d$ represents a functional group having double bond, and n is a real number between 5 and 700. Examples of $R^d$ include a functional group containing a methacryl group as represented by the following formula:

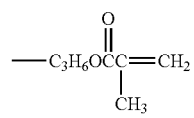

or a functional group containing an acryl group as represented by the following formula:

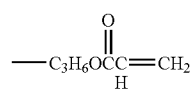

The number average molecular weight of the macromonomer is preferably from 500 to 10000. The comb polymer is preferably a silicone graft acrylic resin as represented by the following general formula (6):

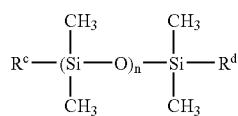

wherein $R^5$-$R^7$ are as follows:

$R^5$: a methyl group, a n-butyl group $R^6$: H, a methyl group $R^7$: a functional group attached to an alkylene group or a polyoxyalkylene group, x is a real number between 1 and 500, y is a real number between 0 and 100, z is a real number between 1 and 100, and n is a real number between 1 and 135.

As described above, the clear paint for golf balls is an urethane paint which mainly contains material polyol and isocyanate. To incorporate the graft polymer used in the second aspect into the structure of polyurethane, the acrylic resin as the backbone chain preferably has at least one hydroxyl group, more preferably has two or more hydroxyl groups, and most preferably has three hydroxyl groups at a terminal end or a branch.

Examples of the silicone graft acrylic resin include a resin having a structure as represented by the following general formula (7):

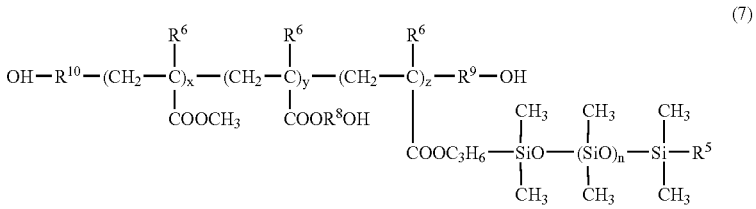

wherein $R^5$-$R^{10}$ are as follows:

$R^5$: a methyl group, a n-butyl group $R^6$: H, a methyl group $R^8$, $R^8$, $R^{10}$: polyoxyalkylene groups or alkylene groups, X is a real number between 1 and 500, y is a real number between 0 and 100, Z is a real number between 1 and 100, and n is a real number between 1 and 135.

The comb polymer such as the silicone graft acrylic resin preferably has 2-10 polyorganosiloxanes as the branched polymers relative to an acrylic resin as the backbone polymer and preferably has a number average molecular weight of 500 to 50000. The viscosity of the comb polymer at a room temperature is preferably from 0.1 to 500 Pa.s in view of the solubility to the clear paint. The hydroxyl value of the comb polymer is preferably from 5 to 150 mg-KOH/g in view of the reactivity.

The clear paint of the present invention is preferably made of a polyurethane resin as the base polymer. The polyurethane resin is preferably prepared by reacting polyol and isocyanate with the aforementioned modified silicone oil or the graft polymer.

In the clear paint of the first aspect, the ratio of the modified silicone oil is preferably from 0.01 to 2 parts by weight relative to 100 parts by weight of polyol.

In the clear paint of the second aspect, the ratio of the graft polymer is preferably from 0.01 to 10 parts by weight relative to 100 parts by weight of polyol.

When the ratio of the modified silicone oil or the graft polymer is lower than the range as mentioned above, the effects for improving the properties such as the sliding property which will be obtained by adding the modified silicone oil or the graft polymer can not be sufficiently obtained. When the ratio is higher than the range as mentioned above, the adhesion to the base is poor. It is preferable that the modified silicone oil or the graft polymer is added to a polyol component which is the raw material component of the polyurethane resin as its base polymer in such a manner that the ratio thereof is in the aforementioned range.

When the modified silicone oil or the graft polymer is added as the material of polyurethane resin, the modified silicone oil or the graft polymer is preferably diluted by a solvent such as methyl ethyl ketone or methyl isobutyl ketone in order to improve the solubility thereof.

The polyol and isocyanate as the material of polyurethane resin may be any polyol and isocyanate which are usually used for urethane paints. Examples are as follows.

[Polyol]

Examples of the polyol include aliphatic, alicyclic, and aliphatic aromatic polyhydric alcohols. Concrete examples include the followings: ethylene glycol, diethylene glycol, propylene glycol, cyclohexanedimethanol, glycerol, trimethylolpropane, hexanetriol, pentaerythritol, sorbitol, and the like; polymer (polyether) polyols which are modified with hydrocarbon group having an oxirane group such as ethylene oxide or propylene oxide by using any of the above-mentioned alcohols as an initiator; amyl polymer polyols which are modified with hydrocarbone having an oxirane group by using alkylamine, or alkanolamine as an initiator; polymer polyols which are prepared by ring-opening an epoxy resin or epoxidized oil containing an oxirane group with water or alkanolamine; and lactone polyols obtained by ring-opening polymerization of a lactone series such as ε-caprolactone, using any of the above-mentioned alcohols as an initiator. Examples also include polyester polyols which are obtained by reaction of at least one selected from the group consisting of well-known polycarboxylic acids such as oxalic acid, succinic acid, glutaric acid, adipic acid, sebacic acid, maleic acid, fumaric acid, itaconic acid, cyclohexanedicarboxylic acid, phthalic acid, isophthalic acid, and terephthalic acid; and anhydrides thereof, with any of the above-mentioned polyhydric alcohols. Examples further include alkyd polyols which are obtained by ester-interchange or esterification of polyhydric alcohol with known oil, castor oil, or fatty acid and esterification of the above-mentioned polybasic acid with such oil.

Preferable examples of polyol are acrylic polyols and polyester polyols obtained by copolymerization of acrylic monomer such as acrylic acid and methacrylic acid. The polyol preferably has two or more of hydroxyl groups in its molecules.

[Isocyanate]

Examples of the isocyanate include aliphatic, alicyclic, and aliphatic aromatic polyisocyanates. Examples of the aliphatic polyisocyanate are 1,6-hexamethylenediisocyanate, 1,4-tetramethylenediisocyanate, 2,2,4- or 2,4,4-trimethylhexamethylenediisocyanate, and 2,6-diisocyanate methyl caproate (lysine isocyanate). Examples of the alicyclic polyisocyanate are 1,3- or 1,4-diisocyanate cyclohexane, 1,3- or 1,4-bis(isocyanatemethyl)cyclohexane, dicyclohexylmethane-4,4'-diisocyanate, isopropyridyl-bis(4-cyclohexylisocyanate), 3-isocyanatemethyl-3,5,5-trimethylcyclohexylisocyanate (isophorone diisocyanate), norbornenediisocyanate, and the like. Examples of the aliphatic aromatic polyisocyanate are xylylene diisocyanate, tetramethylxylyene diisocyanate, 4,4'-bis(isocyanate methyl)diphenylmethane, and the like. Alternatively, compounds obtained by addition reaction of the above-mentioned diisocyanate and the polyol, and trimerized compounds and polymerized compounds having a diisocyanate and a biuret or an isocyanurate ring may also be employed.

Among these examples of the isocyanate, a non-yellowing isocyanate such as hexamethylenediisocyanate is particularly preferable.

It is preferable that the polyol component containing the aforementioned polyol and either the modified silicone oil or the graft polymer, and the isocyanate are added in such a manner that the mole ratio of NCO/OH ranges from 0.5 to 1.5.

The method of applying the clear paint of the present invention to a golf ball is not specifically limited, so the clear paint can be applied according to an ordinary method. After washing and cleaning a golf ball surface to be coated (uncoated surface), the golf ball surface is subjected to physical pretreatment such as sand blasting and then to chemical treatment such as acid treatment. After the surface treatment, the ball surface is coated with a white paint and then marked. After that, the ball surface is coated with the clear paint. As the ordinary coating methods, there are air gun coating and electrostatic coating.

In manufacturing golf balls of the present invention by applying the clear paint of the present invention to the golf ball surface, the thickness of a clear paint layer formed by the clear paint is preferably in a range from 3 to 50 μm.

The golf balls of the present invention include wound yarn golf balls and solid golf balls such as one- and two-piece solid golf balls. Particularly, the present invention is suitably applied to one-piece solid golf balls of which base bodies are poor in sliding property.

The clear paint of the present invention may be applied directly to a golf ball after surface treatment. The clear paint of the present invention may be applied as the finishing to a golf ball which is coated with a white enamel paint after surface treatment. It should be noted that the paint is normally clear, but may be colored if necessary.

According to the present invention, golf balls having a clear paint layer formed thereon can be provided in which the paint layer has excellent scuff resistance, is hardly contaminated so that dirt on the ball can be easily wiped off, has low friction factor on its surface, thus excellent sliding property, and is capable of persisting its sliding property for a long period of time.

Examples and Comparative Examples are given below for describing the present invention more concretely.

EXAMPLE 1 AND COMPARATIVE EXAMPLE 1

Each of clear paint layers of which average thickness was 20 μm was formed by splaying an urethane paint containing a modified silicone oil having mix proportion as shown in Table 1 onto a one-piece solid golf ball coated with white paint, and drying and hardening the paint at 60° C. for 90 minutes. Each golf ball was subject to a sand abrasion test and a sand/water abrasion test as described below. The results are shown in Table 1.

[Sand Scuff Test]

Balls finished with the clear paint and sand were put into a ball mill and the ball mill was operated for 8 hours. After that, the balls were taken out and visually observed. In case of little flaw, "Good" was given for evaluation.

[Sand/Water Scuff Test]

Balls finished with the clear paint and water were put into a ball mill containing the sand and the ball mill was operated for 8 hours. After that, the balls were taken out and dried. The sliding property of the balls was evaluated. When the balls did not adhere to each other, "Good" was given for evaluation. When the balls adhered to each other, "Inferior" was given for evaluation.

TABLE 1

| Example | Example 1 | Comparative Example 1 |
|---|---|---|
| Mix Proportion of Polyurethane Resin (parts by weight) | | |
| Polyester Polyol *1 | 100 | 100 |
| Hardener *2 | 100 | 100 |
| Solvent (methyl isobutyl ketone) | 50 | 50 |
| Modified Silicone Oil | | |
| Modified silicone oil having two or more hydroxyl groups at one terminal end *3 | 0.25 | — |
| Organic modified polysiloxane including hydroxyl group disclosed in JPH5-269221A *4 | — | 0.25 |
| Mole Rate of NCO/OH | 1.0 | 1.0 |
| Evaluation | | |
| Sand Scuff Test | Good | Good |
| Sand/Water Scuff Test | Good | Inferior |

*1: Polyester Polyol obtained from polybasic acid and polyhydric alcohol
*2: hexamethylenediisocyanate
*3: "X22-176F" available from Shinetsu Chemical Co., Ltd, having a structure represented by the above general formula (1), in which RA is a methyl group or a butyl group, and RB is represented by the following formula:
Viscosity (23° C.) 500 mm²/s, hydroxyl value 8 mg-KOH/g

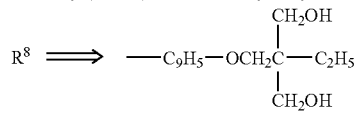

*4: "Byk-370" available from BYK Chemie Japan K.K.

It is apparent from Table 1 that the clear paint containing a modified silicone oil having two or more hydroxyl groups at one terminal end has excellent scuff resistance and excellent persistence of sliding property.

EXAMPLE 2 AND COMPARATIVE EXAMPLE 2

Each of clear paint layers of which average thickness was 20 µm was formed by splaying an urethane paint containing a comb polymer or a graft polymer having mix proportion as shown in Table 2 onto a one-piece solid golf ball coated with white paint, and drying and hardening the paint at 60° C. for 90 minutes. Each golf ball was subject to an initial slide test, the sand scuff test, and the sand/water scuff test by the same method as Example 1. The results are shown in Table 2.

TABLE 2

| Example | Example 2 | Comparative Example 2 |
|---|---|---|
| Mix Proportion of Polyurethane Resin (parts by weight) | | |
| Polyester Polyol *1 | 100 | 100 |
| Hardener *2 | 100 | 100 |
| Solvent (methyl isobutyl ketone) | 50 | 50 |
| Comb Polymer *3 | 0.5 | — |
| Organic modified polysiloxane including hydroxyl group disclosed in JPH5-269221A *4 | — | 0.5 |
| Mole Rate of NCO/OH | 1.0 | 1.0 |
| Evaluation | | |
| Initial Slide Test | Good | Good |
| Sand Scuff Test | Good | Good |
| Sand/Water Scuff Test | Good | Inferior |

*1: Polyester Polyol obtained from polybasic acid and polyhydric alcohol
*2: hexamethylenediisocyanate
*3: Comb polymer of which backbone polymer is composed of polymethyl methacrylate and branched polymers are composed of polydimethylsiloxane, having a structure as represented by the aforementioned general formula (7), in which $R^5$, $R^6$ are methyl groups, and $R^8$, $R^9$, $R^{10}$ are methylene groups. The number of the branched polymers is three relative to one backbone polymer. Viscosity (23° C.) 32.5 Pa · s, hydroxyl value 64.6 mg-KOH/g
*4: "Byk-370" available from BYK Chemie Japan K.K.

It is apparent from Table 2 that the clear paint containing a graft polymer has excellent scuff resistance and excellent persistence of sliding property.

What is claimed is:

1. A clear paint for golf balls consisting essentially of a base polymer including a polyurethane resin, and a graft polymer including a comb polymer having a backbone portion formed of an acrylic resin and a branch portion formed of polyorganosiloxane, said backbone portion having at least one hydroxyl group.

2. A clear paint for golf balls as claimed in claim 1, wherein the branch portion formed of polyorganosiloxane has a main chain portion formed of polydimethylsiloxane.

3. A clear paint for golf balls as claimed in claim 1, wherein the polyurethane resin is a material obtained by reacting polyol and isocyanate, which is reacted with said graft polymer, a ratio of the graft polymer being in a range from 0.01 to 10 parts by weight relative to 100 parts by weight of the polyol.

4. A clear paint for golf balls as claimed in claim 1, wherein the comb polymer is obtained by radical copolymerization of a macromonomer represented by the following general formula with an acrylic monomer:

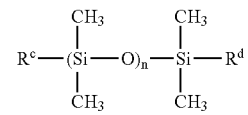

wherein $R^c$ represents a nonreactive alkyl group, and $R^d$ represents a functional group having a double bond portion.

5. A clear paint for golf balls as claimed in claim 4, wherein the comb polymer is a silicone graft acrylic resin represented by the following general formula:

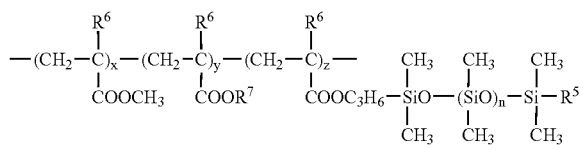

wherein $R^5$-$R^7$ are as follows:

$R^5$: a methyl group, a n-butyl group $R^6$: H, a methyl group $R^7$: a functional group attached to an alkylene group or a polyoxyalkylene group, x is a real number between 1 and 500, y is a real number between 0 and 100, z is a real number between 1 and 100, and n is a real number between 1 and 135.

6. A clear paint for golf balls as claimed in claim 1, further containing a solvent.

7. A clear paint for golf balls as claimed in claim 6, wherein said solvent is at least one of methyl ethyl ketone and methyl isobutyl ketone.

8. A golf ball having a surface coated with the clear paint for golf balls as claimed in claim 1.

9. A clear paint for golf balls as claimed in claim 1, wherein said comb polymer includes at least three branch portions formed of polyorganosiloxane.

10. A clear paint for golf balls as claimed in claim 1, wherein said comb polymer has a number average molecular weight from 500 to 50000, a viscosity from 1 to 50000 Pa.s at a room temperature, and a hydroxyl value from 5 to 150 mgKOH/g.

* * * * *